United States Patent [19]

Hata

[11] Patent Number: 4,689,812
[45] Date of Patent: Aug. 25, 1987

[54] CORDLESS TELEPHONE

[75] Inventor: Mamoru Hata, Tokyo, Japan

[73] Assignee: NEC Corporation, Tokyo, Japan

[21] Appl. No.: 896,352

[22] Filed: Aug. 14, 1986

[30] Foreign Application Priority Data

Aug. 20, 1985 [JP] Japan ................................ 60-182791

[51] Int. Cl.⁴ .............................................. H04Q 7/04
[52] U.S. Cl. ........................................ 379/62; 379/61
[58] Field of Search ....................... 379/61, 62, 63, 58, 379/110, 354, 357, 230, 207

[56] References Cited

U.S. PATENT DOCUMENTS

| 4,213,009 | 7/1980 | Suzuki | 379/61 |
| 4,508,935 | 4/1985 | Mastromoro | 379/62 |
| 4,646,345 | 2/1987 | Zouner et al. | 379/62 |

Primary Examiner—Robert Lev

Attorney, Agent, or Firm—Sughrue, Mion, Zinn, Macpeak and Seas

[57] ABSTRACT

A cordless telephone having a fixed unit and a portable unit which are capable of exchanging an identification (ID) signal assigned to the telephone with each other is disclosed. The portable unit includes a receiver circuit which in turn includes a low-frequency section. A cut-off/attenuation circuit, a logic circuit and a timer circuit are built in the low-frequency section of the receiver circuit. The cut-off/attenuation circuit cuts off or attenuates the ID signal when a conversation is under way. The logic circuit controls the cut-off/attenuation circuit while the timer circuit determines a period of time for the ID signal to be cut off or attenuated. The cut-off/attenuation circuit is enabled after the transmission of the ID signal over a predetermined period of time as determined by the timer circuit, thereby cutting off or attenuating the ID signal returned from the fixed unit to the portable unit.

2 Claims, 2 Drawing Figures 4,689,812

CORDLESS TELEPHONE

BACKGROUND OF THE INVENTION

The present invention relates to a cordless telephone and, more particularly, to a cordless telephone having a fixed unit and a portable unit which exchange an identification signal assigned to the own telephone.

As well known in the art, a cordless telephone is made up of a fixed unit, or part which is connected to a subscriber line, and a portable unit, or part, which is connected to the fixed unit by a radio link. Generally a particular identification (ID) number is assigned to each cordless telephone so as to avoid interference and erroneous connection between the independent cordless telephones. There is known a system which causes the ID number to be exchanged as an ID signal between a fixed and a portable units of a cordless telephone even when a conversation is under way, thereby allowing the two units to identify each other continuously till the end of conversation. In this prior art system, while one of the two cooperative units transmits the ID signal, the other responds to and identifies the ID signal and, then, returns it, i.e., the fixed and portable units enable a communication to be held while confirming the ID signal.

The prior art cordless telephone as discussed above has a relatively simple radio circuit construction so that the ID signal of the kind stated is usually implemented with an audible frequency. The problem is, therefore, that the ID signal returned from the fixed unit to the portable unit is heard through a speaker to be offensive to the ear very much.

SUMMARY OF THE INVENTION

It is therefore an object of the present invention to provide a cordless telephone which allows an ID signal to be exchanged between a fixed and a portable units during a conversation and, yet, prevents an annoying audible signal due to the ID signal from being produced.

It is another object of the present invention to provide a generally improved cordless telephone.

A portable unit of a cordless telephone of the present invention has a transmitting section and a receiving section and exchanges an identification (ID) signal assigned to the cordless telephone with a fixed unit. The portable unit comprises a cut-off/attenuation circuit installed in the receiving section for cutting off/attenuating the ID signal when a conversation is under way, a logic circuit for controlling the cut-off/attenuation circuit, and a timer circuit for determining a period of time during which the cut-off/attenuation circuit cuts off/attenuates the ID signal. The cut-off/attenuation circuit is enabled after transmission of the ID signal over the period of time which is determined by the timer circuit, whereby the ID signal returned from the fixed unit to the portable unit is cut off or attenuated.

The above and other objects, features and advantages of the present invention will become more apparent from the following detailed description taken with the accompanying drawings.

DESCRIPTION OF THE PREFERRED EMBODIMENT

Figure 1:
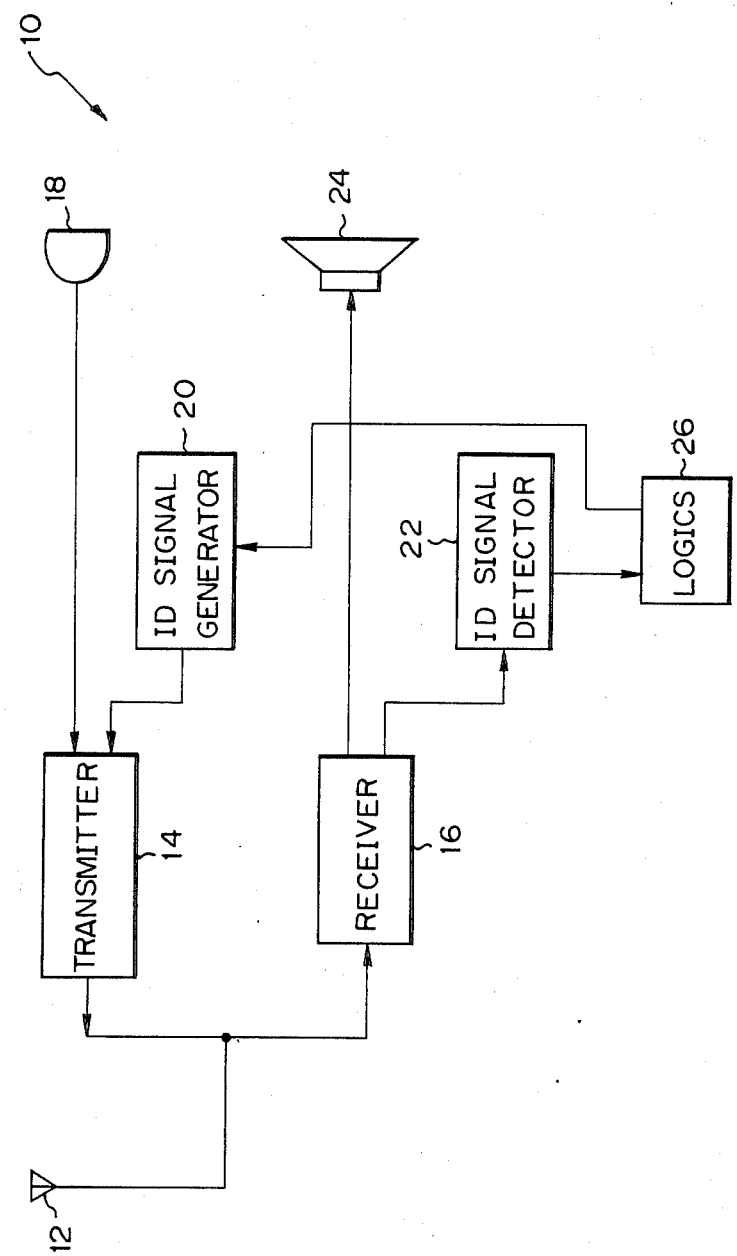
FIG. 1 is a block diagram showing a portable unit of a prior art cordless telephone.

To better understand the present invention, a brief reference will be made to a portable unit of a prior art cordless telephone, shown in FIG. 1. As shown, the portable unit, generally 10, comprises an antenna 12, a transmitter 14, a receiver 16, a microphone 18, an ID signal generator 20, an ID signal detector 22, a speaker 24, and a logic circuit, or logics, 26.

While a conversation is held in a usual condition, voice entered through the microphone 18 is modulated by the transmitter 14 and, then, sent via the antenna 12 to a fixed unit, not shown. In response, the fixed unit demodulates the incoming signal and sends it out to a remote telephone over a subscriber line. Meanwhile, voice from the remote station which comes in the fixed unit over the subscriber line is modulated by the fixed part, then transmitted from an antenna of the fixed unit to the antenna 12 of the portable unit 10, and then demodulated by the receiver 16 to drive the speaker 24 directly.

An ID signal, on the other hand, is delivered from the ID signal generator 20 to the transmitter 14 of the portable unit and therefrom to the antenna 12 to be sent to the fixed unit. The fixed unit checks demodulation of the ID signal and, if the ID signal come in is a one assigned to the portable unit 10, sends an ID signal to the portable unit 10 via the antenna of its transmitter. The ID signal reached the portable unit 10 is demodulated via the antenna 12 and receiver 16, the demodulated ID signal being applied to the ID signal detector 22.

In the prior art cordless telephone having the above construction, the ID signals are of an audible frequency. This, as previously stated, has a drawback that the signal returned from the fixed unit to the portable unit is annoying because it is heard through the speaker 24.

Figure 2:
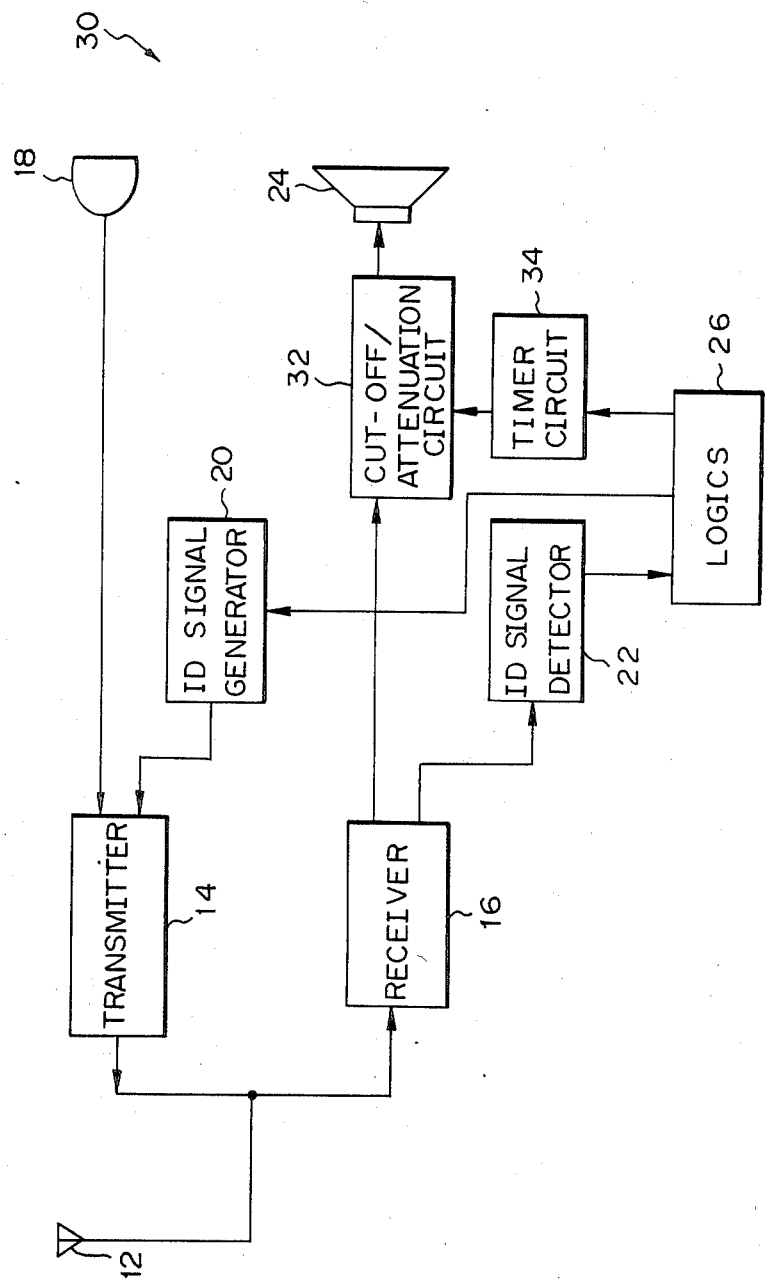
FIG. 2 is a block diagram of a portable unit of a cordless telephone in accordance with the present invention.

Referring to FIG. 2, a portable unit of a cordless telephone embodying the present invention which is free from the drawback of the prior art one is shown and generally designated by the reference numeral 30. In FIG. 2, the same or similar structural elements as those of FIG. 1 are designated by like reference numerals. As shown, the portable unit 30, like the portable unit 10, includes an antenna 12, a transmitter 14, a receiver 16, a microphone 18, an ID signal generator 20, an ID signal detector 22, a speaker 24, logics 26. Characteristic features of the portable unit 30 are a cut-off/attenuation circuit 32 and a timer circuit 34. While a conversation is held in a usual condition, voice entered through the microphone 18 is modulated by the transmitter 14 and, then, sent via the antenna to a fixed unit, not shown. In response, the fixed unit demodulates the incoming signal and sends it out to a remote telephone over a subscriber line. Meanwhile, voice from the remote station which comes in the fixed unit over the subscriber line is modulated by the fixed unit, then transmitted from an antenna of the fixed unit to the antenna 12 of the portable unit 30, and then demodulated by the receiver 16. The low-frequency output of the receiver 16 is applied to the speaker 24 via the cut-off/attenuation circuit 32 which is held inoperative at that time.

An ID signal, on the other hand, is delivered from the ID signal generator 20 to the transmitter 14 of the portable unit and therefrom to the antenna 12 to be sent to the fixed unit. The fixed unit checks demodulation of the ID signal and, if the ID signal come in is a one assigned to the portable unit 30, sends an ID signal to the portable unit 30 via the antenna of its transmitter. The ID signal reached the portable unit 30 is demodulated via the antenna 12 and receiver 16, the demodulated ID signal being applied to the ID signal detector 22. However, during a predetermined period of time between the transmission of the ID signal from the ID signal generator 20 and the full reception of the ID signal from the fixed unit, the cut-off/attenuation circuit 32 is enabled by the logics 26 and timer circuit 34 to prevent the incoming ID signal from being produced from the speaker 24.

In summary, it will be seen that a cordless telephone of the present invention eliminates annoying signal tones to thereby enhance quality communication. This unprecedented advantage is derived from a cut-off/attenuation circuit which is enabled by a logic circuit and a timer circuit over a predetermined period of time after the transmission of an ID signal, a signal tone then being cut off or attenuated.

Various modifications will become possible for those skilled in the art after receiving the teachings of the present disclosure without departing from the scope thereof.

What is claimed is:

1. A portable unit of a cordless telephone which has a transmitting section and a receiving section and exchanges an identification (ID) signal assigned to said cordless telephone with a fixed unit, comprising:
    a cut-off/attenuation circuit installed in said receiving section for cutting off/attenuating the ID signal when a conversation is under way;
    a logic circuit for controlling said cut-off/attenuation circuit; and
    a timer circuit for determining a period of time during which said cut-off/attenuation circuit cuts off/attenuates the ID signal;
    said cut-off/attenuation circuit being enabled after transmission of the ID signal over the period of time which is determined by said timer circuit, whereby the ID signal returned from said fixed unit to said portable unit is cut off or attenuated.

2. A portable unit as claimed in claim 1, further comprising an ID signal detector for detecting the ID signal received by said receiving section, and an ID signal generator for generating the ID signal to be send from said transmitting section.

* * * * *